May 17, 1932.  H. S. COE  1,858,357
FILTER METHOD AND APPARATUS
Filed March 3, 1930  2 Sheets-Sheet 1
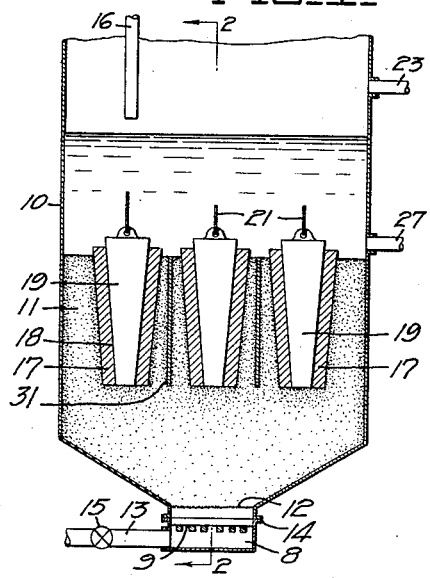
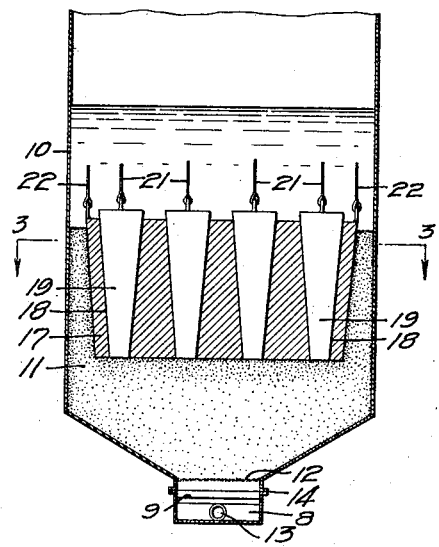
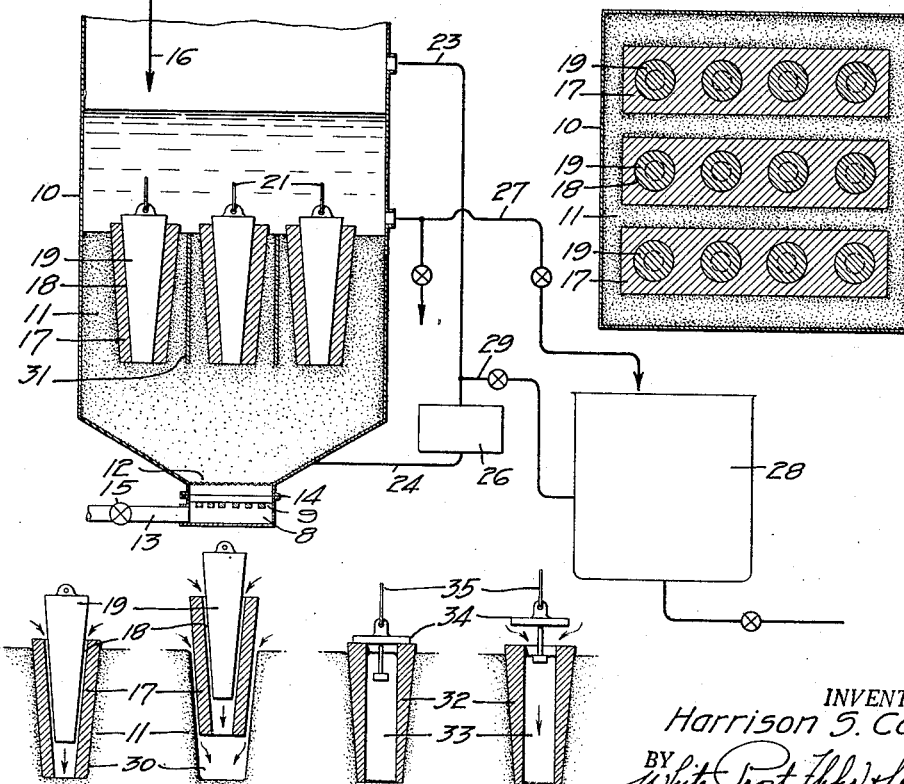
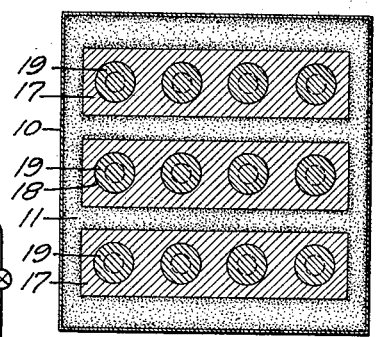
INVENTOR.
Harrison S. Coe
BY White, Prost, Hhhr & Lothrop
ATTORNEYS.

May 17, 1932.  H. S. COE  1,858,357
FILTER METHOD AND APPARATUS
Filed March 3, 1930   2 Sheets-Sheet 2
FIG_9_
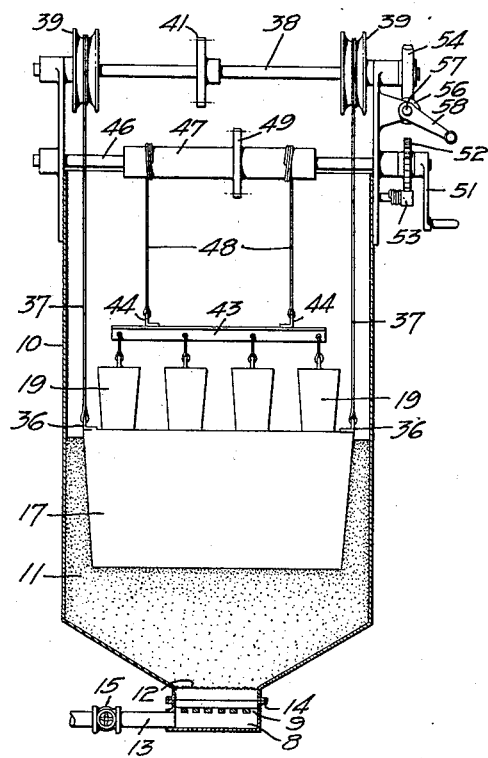
FIG_10_
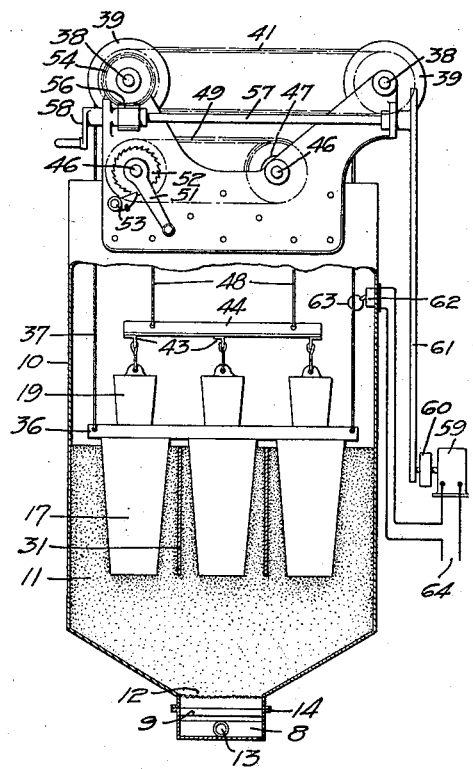
FIG_11_
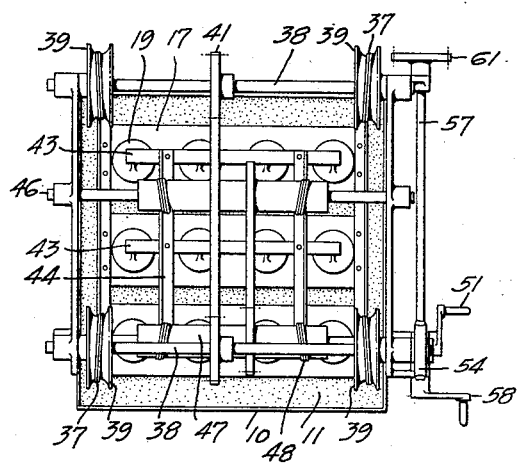
INVENTOR.
Harrison S. Coe
BY White, Prost, Flehr & Lothrop
ATTORNEYS.

Patented May 17, 1932

1,858,357

UNITED STATES PATENT OFFICE

HARRISON S. COE, OF PALO ALTO, CALIFORNIA

FILTER METHOD AND APPARATUS

Application filed March 3, 1930. Serial No. 432,737.

This invention relates generally to filter methods and apparatuses for the separation or removal of solid constituents from fluid feed material and for leaching soluble substances from granular material. It relates particularly to filters of the type in which the fluid feed material is caused to pass thru a filter bed formed of a granular medium, and which are commonly termed "sand filters".

Sand filtration such as has been practised in the past generally constitutes a number of steps forming what can be termed a filtration cycle. For example a suitable sand or filter bed is first prepared thru which the filtrate or the fluid feed being filtered can be passed. The fluid feed material is then introduced upon the inflow side of the filter bed and is caused to percolate or pass the filter medium. At the end of the filtering cycle, or when the sand bed becomes fouled with filtered solids, the sand or other filtering medium must be cleansed.

While sand filtration affords a simple and effective method of clarifying liquid, as practised in the past it has been subject to many objections. For example the installation is generally relatively large compared to its capacity, thus adding to its initial cost, and considerable manual attention is required. Furthermore such installations require a relatively large amount of sand and consequently cleansing of the bed involves an excessive loss of filtrate and the use of large quantities of washing fluid. Large quantities of sand are used because surface caking and impregnating of the surface layers of sand obstruct the rate of percolation while the major portion of the bed is relatively clear.

In order to increase the capacity of sand filters, various improved methods have been devised. For example in one such method the surface of the sand bed is continuously skimmed to maintain the percolation rate of the filtrate and to prevent soaking the surface of the bed with a layer of filtered solids. In another method the filter bed is made of relatively coarse sand so that the filtration and separation of solids takes place throughout the bed. The first of these proposed methods serves to prolong the filtering cycle but requires either new sand or a storage of old sand, after a cleansing or washing operation, for each cycle of operation. The second mentioned method is subject to the objection that the sand interstices can only carry a small amount of solids, and therefore frequent washing or cleansing is required. Furthermore because of the coarse sand the filtering action may not be as efficient as desired, and it is frequently necessary to flocculate the feed material prior to filtration.

It is an object of the present invention to devise a method and apparatus of the above character which will make possible apparatus of relatively high capacity compared to its size, and which will require a relatively small quantity of sand. In attaining this object it is characteristic of the invention that the filter bed can be readily cleansed without requiring frequent renewal or storage of the sand, and relatively fine sand can be employed to secure efficient filtering action.

It is a further object of the invention to devise a filtering method and apparatus which will tend to maintain its capacity as the filtering period progresses, without the necessity of resorting to skimming of filtered solids. As will be presently explained this object is attained by controllably increasing the effective area of the surface of the filter bed presented to the liquid to be filtered.

Further objects of the invention will appear from the following description in which the preferred embodiments of the invention have been set forth in detail in conjunction with the accompanying drawings. It is to be understood that the appended claims are to be accorded a range of equivalents consistent with the state of the prior art.

Referring to the drawings:

Figure 1 is a side elevational view in cross section illustrating apparatus incorporating the present invention.

Fig. 2 is a cross sectional view taken along the line 2—2 of Fig. 1.

Fig. 3 is a cross sectional view taken along the line 3—3 of Fig. 2.

Fig. 4 is a side elevational view illustrating the manner in which my apparatus is utilized in a complete filter cycle.

Figs. 5, 6, 7 and 8 are cross sectional details illustrating certain features of the method constituting the present invention.

Fig. 9 is a side elevational view in cross section illustrating a modified form of apparatus incorporating the present invention, in which mechanical means is provided for performing certain operations.

Fig. 10 is a side view of the apparatus as shown in Fig. 9.

Fig. 11 is a plan view of the apparatus shown in Figs. 9 and 10.

The method of the present invention can best be explained after a description of the apparatus shown in Figs. 1 to 4 inclusive. Thus referring to Figs. 1, 2 and 3, the apparatus includes a vessel or container 10 within which a suitable filter bed 11 has been formed. While this filter bed is generally of sand, it can be formed of any suitable granular filter medium. A screen or grid 12 is fixed to the lower end of the vessel 10 to serve as a special support for bed 11. A box 8 is disposed below the grid 12 and is provided with a suitable detachable connection 14 to the vessel. This box is provided with a suitable replaceable filter diaphragm 9 and with a valve controlled outlet conduit 13. Valve 15 has been shown for controlling outlet 13. Pipe 16 serves to introduce fluid feed material into vessel 10 above the filter bed. In this instance since the fluid feed is introduced into the upper part of vessel 10, the upper side of the filter bed can be termed the inflow side, while the lower surface forms the outflow side.

Positioned within the filter bed 11 there are shown a plurality of forms or form members 17, which in this instance are tapered towards their lower ends. These form members 17 should have sufficient rigidity to form definite pockets within the filter bed, and they are preferably sufficiently heavy that they can be readily set within the sand of the bed. Each member 17 is provided with a plurality of downwardly extending tapered passages 18, which are adapted to receive tapered plugs 19. To facilitate withdrawal movements of plugs 19, the upper ends of these plugs have been shown connected to cables 21, and similarly members 17 are shown connected to cables 22.

It has been found convenient to incorporate the apparatus of Figs. 1, 2 and 3, with additional means as shown in Fig. 4. Thus in this instance pipes 23 and 24, communicating with the upper and lower portions of vessel 10, are connected by pump assembly 26, which is suitably arranged for reversing its intake and outlet connections. Pipe 27 also serves to connect the upper portion of vessel 10, at a point below the point of communication of pipe 23, with a suitable reservoir or receiver 28. Reservoir 28 is adapted to contain wash water and can be connected with the intake side of pump 26 by pipe 29.

To explain the method of the present invention, which in this particular instance is carried out by the apparatus shown in Fig. 4, it will be presumed that filter bed 11 has been formed within vessel 10 and that form members 17 are set within this bed as shown. Plugs 19 are fitted in passages 18 of form 17, as at the end of the cycle while forming the bed. With a substantial depth of liquid (or feed material) above the surface of the filter bed, valve 15 is opened and filtration begins. A pressure gradient is established within the bed. In other words the pressure within the bed increases towards the surface thereof, or conversely the suction in the bed increases from the surface towards the outlet. This pressure gradient is caused by the resistance to flow within the bed.

To explain the effect of the pressure gradient within the filter bed as it relates to my invention, the following example is given. If a sheet of wax paper or other impervious medium is laid on the bed of a small sand filter, to cover its surface, while the filter is operating under suction, it will be drawn tightly to the bed. If now a hole is made in the paper, liquid will flow thru it rapidly into the bed and will diminish the suction on the paper about the hole, while at the same time the sand surface at the hole will be drawn down to the bed. Thus if in the present method plugs 19 are now raised, liquid will flow downwardly thru passages 18 and enter the sand at the bottom of members 17, thereby releasing the suction from the bottom of these members. Members 17 can now be raised as indicated in Figure 3, leaving cavities 30 filled with fluid to be filtered. These cavities thus formed tend to remain open for the reason above described, as they are sustained by the pressure gradient from the liquid to the interior of the bed which becomes very pronounced as the surface becomes choked with filter material. The raising of form members 17 increases the surface area of the filter by an amount equal to the side and end areas of these members.

The effective exposed area of the filter surface can be controlled to a marked degree by adjusting the positions of members 17. For example members 17 can first be raised a small amount to establish a desired flow thru the filter bed, and as the exposed surfaces become clogged or impregnated with filtered solids, members 17 can be drawn outwardly either intermittently or continuously to expose an increased surface area. After all of the available surface area has become clogged or impregnated with filtered solids, the sand can be cleansed by a counterflow of wash water introduced thru pipe 24 from reservoir 28. During a washing operation the wash water can be returned to pump 26 thru pipe 23 and continuously recirculated, or the direction of circulation can be reversed, passing suspended sand thru pipe 24, thru pump assembly 26, and thru pipe 23, to more perfectly scour the filter medium. At the end of a washing operation the sand is permitted to settle to establish a new filter bed, with members 17 set within the bed as shown in Fig. 4. Washing liquid can be decanted from the surface of the bed and returned to tank 28 thru pipe 27, or it can be discharged to waste thru pipe 7. After draining the bed thru conduit 13, box 8 can be removed by breaking connection 14, in order to facilitate repairs to filter diaphragm 9. This operation can be carried out without emptying the vessel, as grid 12 will support the drained sand bed 11, even though relatively coarse.

If form members 17 are set relatively close together the sand of the filter bed between the same may not be self-supporting. In such event it is preferable to employ upright walls 31 permanently fixed within vessel 10, and arranged to tend to reinforce and support the sand between form members 17.

It is apparent that other equivalent means can be employed for introducing liquid into the lower end of the cavities formed by form members 17. Thus as shown in Figs. 7 and 8 I have shown a form member 32 provided with longitudinal passage 33. The upper end of passage 33 is adapted to be closed by a valve member 34, to prevent upward circulation in passage 33 and the filling of these passages with granular material during the settling of the bed. Upon pulling upwardly of cable 35, the first effect is to open valve 34 and upon continued upward movement of valve member 34, form member 32 is raised as shown in Fig. 8.

In Figs. 9, 10 and 11 I have shown a more elaborate apparatus which is provided with mechanical means for elevating forms 17 and plugs 19. In this case form members 17 are connected to common cross bars 36, which in turn are connected to cables 37. A rotatable shaft 38 extending across the upper portion of the vessel is provided with sheaves 39 to which cables 37 are connected. Suitable means such as a sprocket and chain connection 41 causes shafts 38 to rotate in unison. The plugs 19 of each form 17 are connected to common bars 43 and these bars are in turn connected by cross bars 44. Shafts 46 are shown journaled parallel to shafts 38, and are provided with drums 47. Cables 48 connected to cross bars 44, are connected to and wound about drums 47. Both shafts 46 are adapted to rotate in unison by the sprocket chain connection 49. Manual crank 51 is shown connected to one of the shafts 46, and by means of a ratchet wheel 52 and pawl 53, rotation of shaft 46 is releasably limited to a direction to wind up cables 48.

For rotating shafts 38, one of these shafts is shown provided with a worm gear 54 operably engaged by a worm 56, this worm being carried upon a rotatable shaft 57. Power can be applied to this shaft by the hand crank 58, or by suitable means such as an electric motor 59. This motor is shown operably connected to shaft 57 thru the speed reducing gear 60 and the drive belt 61.

The operation of the apparatus shown in Figs. 9 to 11 inclusive is substantially the same as that of the apparatus previously described, except that shafts 46 are rotated to lift the plugs 19, and subsequently shafts 38 are rotated to withdraw the form members 17. The form members are preferably withdrawn gradually or in small increments so as to tend to maintain the rate of flow thru the filter bed substantially constant. If desired automatic means can be employed for controlling motor 59, so that withdrawing movements of forms 17 are effected automatically according to the level of liquid above the liquid bed. As an example of suitable means for performing this result, I have shown an electrical switch 62 having contacts which are adapted to be closed by the lifting of a float 63. The contacts of switch 62 are connected in series with the line 64 supplying current to motor 59. In the event that the level of fluid feed above the filter bed increases a sufficient amount to lift float 63, the circuit to motor 59 is automatically closed to elevate forms 17 a certain amount to expose an increased amount of the surface of the filter bed, thus permitting an increased amount of flow downwardly thru the filter. This automatic operation will continue until forms 17 have been withdrawn to such an extent that further withdrawal movement causes no corresponding increase in the effective surface area of the filter bed.

In the above described forms of my apparatus it will be noted that form members 17 are raised simultaneously, thus making desirable the use of the supporting walls 31. However such walls can be omitted by raising alternate forms intermittently, whereby the sand between any two forms always has one side thereof adjacent a stationary form member while the form adjacent the other side is being withdrawn. Such a method requires the use of separate elevating means for the two groups of alternate forms.

It is to be understood that by the term "fluid feed material", as employed in the specification and the annexed claims, I have reference to any mixture of solids and liquids, such as turbid water, oil containing solid impurities in suspension, ore pulps, and similar liquids from which solids can be removed by filtration.

I claim:

1. A method of filtering fluid feed material thru a granular filter medium characterized by the use of a pocket forming member, said method comprising establishing a filter bed of said material and embedding said member therein, withdrawing said member from said bed thereby forming a pocket in said bed, and admitting fluid material to be filtered into said pocket.

2. A method of filtering fluid feed material thru a granular filter medium characterized by the use of a pocket forming member, said method comprising establishing a filter bed of said material and embedding said member therein, withdrawing said member from said bed thereby forming a pocket in said bed, admitting said fluid material to be filtered into said pocket, and conducting the filtering liquid passing thru the walls of said pocket to a point of discharge.

3. A method of filtering fluid feed material thru a granular filter medium characterized by the use of a pocket forming member, said method comprising establishing a filter bed of said material and embedding said member therein, and gradually withdrawing said member from said bed and thereby controllably increasing the filtering surface in contact with the feed material.

4. A method of filtering fluid feed material thru a granular filter medium characterized by the use of a pocket forming member, said method comprising establishing a filter bed of said material with said member set into the same and extending into the bed from the inflow side of the same, thereby forming a pocket in the bed, and withdrawing said member from said pocket while maintaining the side walls of the pocket substantially intact.

5. A method of filtering fluid feed material thru a granular filter medium characterized by the use of a pocket forming member, said method comprising establishing a filter bed of said material with said member embedded therein and extending into the bed from the inflow side of the same, thereby forming a pocket in the bed, withdrawing said member from said pocket, and introducing feed material into the inner end of said pocket to maintain the side walls of the pocket substantially intact during withdrawal movement of said member.

6. A method of filtering fluid feed material thru a granular filter medium characterized by the use of a pocket forming member, said method comprising establishing a filter bed of said material with said member set into the same and extending into the bed from the inflow side of the same, thereby forming a pocket in the bed, introducing feed material into the inner end of said pocket from the inflow side of said bed, and then gradually withdrawing said member to tend to compensate for increased impregnation of the filter medium while the filter is in use.

7. In a method of filtering fluid feed material thru a granular filter medium, the steps of establishing a filter bed of said medium with cavities within the same, and compensating for increased impregnation of said medium during a filtering cycle by effectively increasing the surface area of the cavities during filtration.

8. In a method of filtering fluid feed material thru a granular filter medium for the removal of solid components, the steps of forming a pocket in a bed of the filter medium at the beginning of a filter cycle and mechanically supporting the side walls of the pocket, said pocket extending inwardly from the inflow side of the bed, removing the support for the side walls of said pocket, and introducing feed material into the inner end of said pocket from said inflow side before said support is removed.

9. In a method of filtering fluid feed material thru a granular filter medium for the removal of solid components, the steps of forming a pocket in a bed of the filter medium at the beginning of a filter cycle and supporting the side walls of the pocket, said pocket extending inwardly from the inflow side of the bed, establishing a flow thru said bed, removing the support for the side walls of said pocket, after said flow is established, and introducing feed material into the inner end of the pocket from the inflow side of the bed before said support is removed and after said flow is established.

10. In a filter apparatus, means for containing a filter bed of a granular medium, means for forming a plurality of cavities extending into said bed from the inflow side thereof, said means comprising a plurality of rigid forms withdrawable from said bed, means associated with said form for introducing fluid feed material directly into the inner end of said cavity while said forms are set within said bed, and means for effecting withdrawal movement of said forms during a filter cycle.

In testimony whereof, I have hereunto set my hand.

HARRISON S. COE.